(12) United States Patent
Shannon (10) Patent No.: US 6,256,192 B1
(45) Date of Patent: Jul. 3, 2001

(54) ACCORDION-FOLD LAPTOP COMPUTER

(75) Inventor: Robert Shannon, Leominster, MA (US)

(73) Assignee: Packard Bell NEC, Inc., Woodland Hills, CA (US)

( * ) Notice: Subject to any disclaimer, the term of this patent is extended or adjusted under 35 U.S.C. 154(b) by 0 days.

(21) Appl. No.: 09/370,755

(22) Filed: Aug. 9, 1999

(51) Int. Cl.⁷ .................................................. G06F 1/16
(52) U.S. Cl. ...................... 361/683; 361/687; 312/223.2; D14/100; D14/107
(58) Field of Search .................................. 361/679, 683, 361/686, 687; 312/223.1, 223.2; D14/100, 107; 340/711; 400/680, 682, 641, 693; 345/169

(56) References Cited

U.S. PATENT DOCUMENTS

| | | | |
|---|---|---|---|
| D. 319,222 | * 8/1991 | Mizusugi et al. | D14/100 |
| D. 336,637 | * 6/1993 | Abe et al. | D14/100 |
| D. 340,037 | * 10/1993 | Yokota et al. | D14/100 |
| 4,832,419 | * 5/1989 | Mitchell et al. | 312/223.1 |
| 5,034,858 | * 7/1991 | Kawamoto et al. | 361/683 |
| 5,229,757 | * 7/1993 | Takamiya et al. | 361/681 |
| 5,247,285 | * 9/1993 | Yokota et al. | 361/681 |
| 5,430,607 | * 7/1995 | Smith | 361/683 |
| 5,506,749 | * 4/1996 | Matsuda | 361/683 |
| 5,673,169 | * 9/1997 | Wicks | 361/679 |
| 5,777,704 | * 7/1998 | Selker | 361/681 |
| 5,898,600 | * 4/1999 | Isashi | 345/169 |
| 5,926,364 | * 7/1999 | Karidis | 361/681 |

* cited by examiner

Primary Examiner—Leo P. Picard
Assistant Examiner—Lisa Lea-Edmonds
(74) Attorney, Agent, or Firm—Brian M. Dingman (57) ABSTRACT

An accordion-fold laptop computer, comprising, a first housing having a first edge and an opposing second edge, comprising at least one each of a processor, a hard disk drive and a display screen; a second housing, attached to the first housing proximate the first edge, comprising a keyboard; a third housing, pivotally attached to the first housing proximate the opposing second edge.

27 Claims, 7 Drawing Sheets

ACCORDION-FOLD LAPTOP COMPUTER

FIELD OF THE INVENTION

This invention relates to an improved laptop computer which provides true desktop replacement performance in a portable system.

BACKGROUND OF THE INVENTION

Conventional laptop computers utilize a "clam-shell" design. Although the "clam-shell" laptop is simple to set up, there are numerous drawbacks to the "clam-shell" design. The "clam-shell" design does not have adequate thermal management, is ergonomically unfriendly and lacks versatility. All of these disadvantages preclude currently available laptop computers from becoming true replacements for desktop computers.

Thermal management is a primary concern with any electronic device, especially with laptop computers which comprise heat-sensitive semi-conductor components, in addition to other electronic components, which generate the very heat which negatively impacts component performance, reducing the overall efficiency of the laptop. In the presence of too much heat, the semi-conductor components fail. Dissipating heat generated by laptop components is therefore essential. Although the "clam-shell" design utilizes heat sinks to draw heat away from the components, the location of these heat sinks underneath the keyboard renders them inadequate. For example, during operation of the laptop, the keyboard is laid flat against a surface in a horizontal position, thus trapping the heatsink between the keyboard and the surface. This design does not take advantage of convection cooling and reduces the efficiency of the heat sink because the heat radiating from the heat sink has no where to go. In addition, laptop batteries also generate heat, are enclosed in the same housing as other heat generating components and are also negatively affected by heat. The thermal management problem is further exacerbated by the plastic chassis of a "clam-shell" laptop which acts as an insulator, thus trapping heat inside the laptop housing. Although some laptop computers utilize fans to draw off heat, the fans further reduce battery performance.

The "clam-shell" design is also ergonomically unfriendly to the user because the keyboard is too high for comfort and there is an insufficient amount of space for the user's thumbs to rest between the keyboard and the glidepad to prevent unintended cursor movement. The keyboard is too high and the thumb rest space is too small because the keyboard housing contains virtually all of the laptop's electronic components other than the display, in addition to the keyboard, including the heat sink and receptacle for portable memory devices which increase the depth of the keyboard housing and take up space needed to increase the space between the keyboard and glidepad.

Since the "clam-shell" design is only made up of two housings that fold up like a clam, the versatility of the design is limited because there is no room for moving components around within the housings, such as the heat sink, to improve overall efficiencies and no room to accommodate additional desirable features such as improved ergonomics, more and/or larger batteries, an AC adaptor backpack and a CD ROM or DVD slot. In order to accommodate such components the footprint of the "clam-shell" design would need to be undesirably increased.

SUMMARY OF THE INVENTION

It is therefore a primary object of this invention to provide a portable computer with true desktop replacement performance.

It is a further object of this invention to provide a laptop computer with improved thermal management.

It is a further object of this invention to provide a laptop computer with improved ergonomic features.

It is a further object of this invention to provide a laptop computer with greater battery capacity.

It is a further object of this invention to provide a laptop computer design that is capable of accommodating advances in computer technology without increasing the footprint of the laptop computer.

It is a further object of this invention to provide a laptop computer design with an improved thermal management system, improved ergonomic features, increased battery capacity and design versatility, without substantially increasing the overall thickness or weight of the laptop computer.

It is a further object of this invention to provide a laptop computer with improved performance and increased battery life.

It is a further object of this invention to provide an accordion-fold laptop computer.

It is a further object of this invention to provide a laptop computer with an improved means for dissipating heat.

It is a further object of this invention to provide a laptop computer in which the primary heat-generating electronics of the system are packaged vertically behind the LCD to optimize convection cooling.

It is a further object of this invention to provide a laptop computer with a keyboard housing having a lower pivot point relative to the vertical display housing.

It is a further object of this invention to provide a laptop computer with a lower keyboard height.

It is a further object of this invention to provide a laptop computer with improved glidepad placement.

It is a further object of this invention to provide a laptop computer with a detachable, wireless, battery-powered keyboard which is capable of recharging while attached to the main chassis.

It is a further object of this invention to provide a laptop computer with small footprint docking capability.

It is a further object of this invention to provide a laptop computer with an AC adaptor backpack.

It is a further object of this invention to provide a laptop computer that is easier to set up and to use.

It is a further object of this invention to provide a laptop computer with an auto-deploy mechanism.

It is a further object of this invention to provide a laptop computer which automatically boots upon deployment.

A preferred embodiment of the accordion-fold laptop computer of the invention comprises a first housing having a first edge and an opposing second edge, comprising at least one each of a processor, a hard disk drive and a display screen; a second housing, attached to the first housing proximate the first edge, comprising a keyboard; a third housing, pivotally attached to the first housing proximate the second edge. The first housing is substantially sandwiched between the second and third housings, and the second housing is pivotally attached to the first housing proximate the first edge. The second housing may be removably attached to the first housing proximate the first edge.

The laptop computer of the preferred embodiment may further comprise a means for automatically deploying the laptop computer from the closed position to an open position at which the first housing forms an angle along the first edge with the second housing of at least 90°, and a means for automatically booting a computer program resident in the first housing upon deployment. Similarly, the laptop computer may comprise a means for automatically deploying the laptop to an open position at which the first housing forms an angle along the first edge with the second housing of at least 90° and the first housing forms an acute angle along the second edge with the third housing.

When the laptop of the preferred embodiment is in an open position, the first housing is preferably at least perpendicular to the second housing and further comprises one or more means for receiving a portable memory storage device. The means for receiving a portable memory storage device may comprise at least one slot for receiving one or more floppy disks, CD-ROMs and/or DVD-ROMs.

The third housing of the preferred embodiment may further comprise a power source; the first housing may further comprise a means for dissipating heat, a metal chassis and/or a means for vertically docking to a desktop computer; and the second housing may further comprise a wireless means for communicating with the first housing when the second housing is detached from the first housing.

Another preferred embodiment of the laptop of the invention with an improved thermal management system, comprises, a first housing, comprising at least one each of a processor, a hard disk drive, a means for receiving a portable memory device, a display screen, and a means for actively dissipating heat; a second housing, attached to the first housing, comprising a keyboard; and a means for stabilizing the first housing. The means for stabilizing the first housing preferably comprises a third housing, attached to the first housing, comprising one or more power sources, wherein the third housing is pivotally attached to the first housing, and wherein at least one of the power sources comprises an AC power pack. Similar to the first described preferred embodiment, the second housing preferably is pivotally attached to the first housing. The means for actively dissipating heat may comprise at least one each of, a heat sink, a cool air intake vent and a warm air exhaust vent.

Yet another preferred embodiment of laptop computer of the invention with improved ergonomics, comprises, a first housing, having a bottom edge, comprising at least one each of a processor, a hard disk drive, a means for receiving a portable memory device, a display screen, and a means for actively dissipating heat; a second housing, having a forward edge, a rearward edge and a thickness, wherein the rearward edge is pivotally attached to the first housing proximate the bottom edge of the front housing, comprising a keyboard, wherein the thickness of the second housing decreases from approximately the rearward edge to approximately the forward edge; and a means for stabilizing the first housing. The keyboard preferably comprises a rearward row of keys and a forward row of keys wherein the rearward row of keys is proximate the rearward edge of the second housing, and the second housing further comprises a glidepad proximate the forward edge of the second housing and a thumb rest between the forward row of keys of the keyboard and the glidepad.

Yet another preferred embodiment of the laptop computer of the invention with increased battery capacity, comprises a first housing having a first edge and an opposing second edge, comprising a display screen; a second housing, attached to the first housing proximate the first edge, comprising a keyboard; a third housing, pivotally attached to the first housing proximate the second edge, comprising one or more power sources. The power source preferably comprises a battery pack which preferably comprises one or more lithium polymer batteries. One or more of the power sources may also comprise an AC power pack.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

The accordion-fold laptop computer of the invention generally comprises, a first housing which houses the main vertical chassis of the computer comprising the display, the central processing unit, the hard disk drive, portable disk drives, drive for CD ROMs and/or DVD ROMs, and a heat sink with intake and exhaust vents; a second housing which comprises the keyboard and is pivotally attached to the bottom edge of the first housing; and a third housing which comprises one or more battery or AC power packs and is pivotally attached to the top edge of the first housing. To close the computer, the three housings fold up like the folds on an accordion so that the keyboard side of the second housing folds up against the LCD face of the first housing, and the inside face of the third housing folds down against the rear face of the first housing so that, when the laptop is stowed, the first housing, comprising the main chassis of the computer, is substantially sandwiched between, and protected by, the second and third housings.

Figure 1:
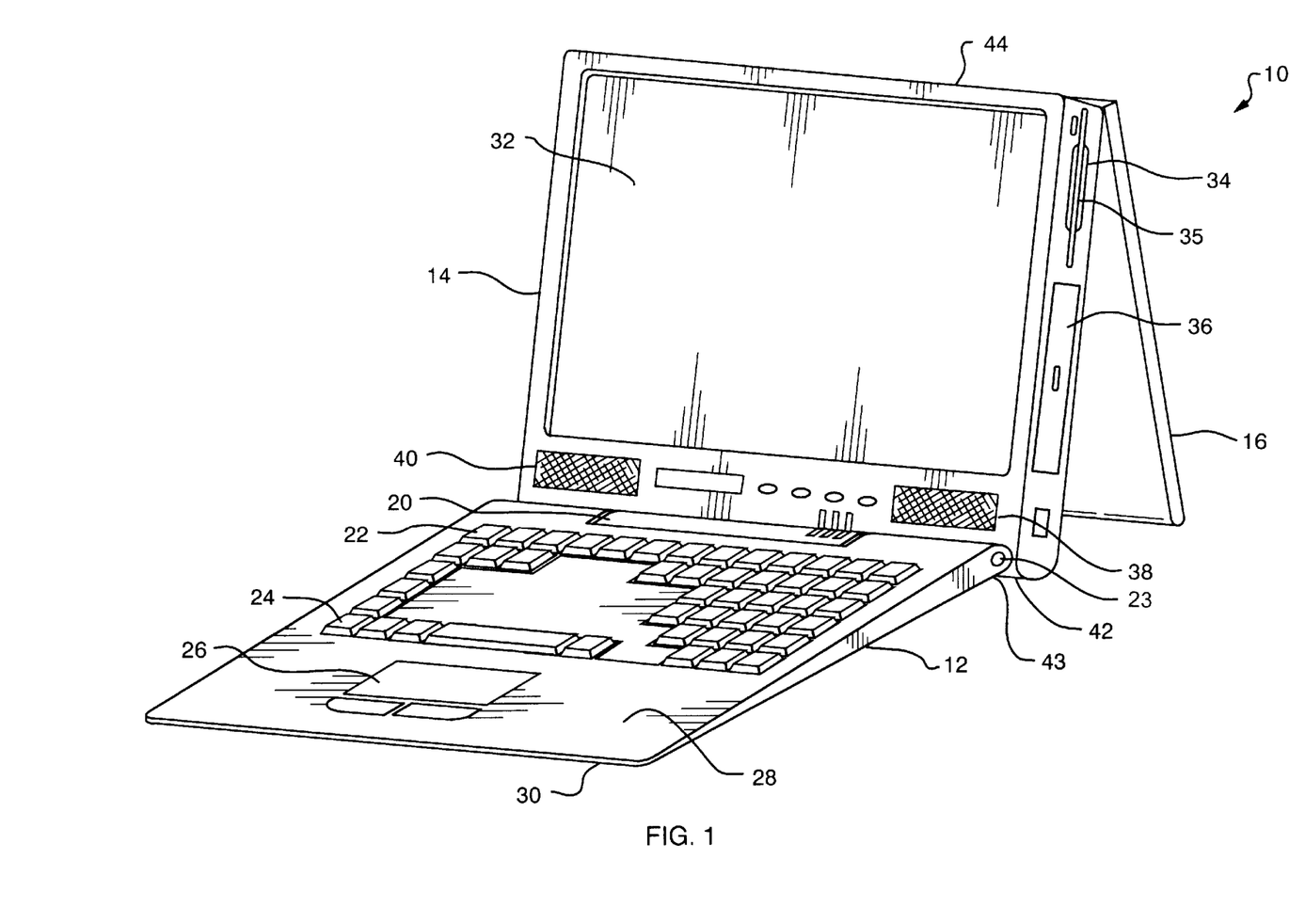
FIG. 1 is a perspective view of the preferred embodiment of the laptop computer of the invention.

The preferred embodiment of the laptop computer of this invention is generally shown and referred to in FIG. 1 as computer 10. Computer 10 comprises a first housing 14, a second housing 12 and a third housing 16. First housing 14 is the main chassis of computer 10 which supports liquid crystal display 32 (LCD), the processing units (not shown in FIG. 1), the hard disk drive (not shown in FIG. 1), floppy disk drive 34, cardbus slot 36, speakers 38 and 40 and a thermal management system (not shown in FIG. 1). Housing 14, including outer chassis 60, is preferably about 3.0 to 3.2 cm thick. The total thickness of computer 10 is preferably about 5 cm.

Second housing 12 can be detached from first housing 14 and houses the keyboard bounded by key row 22 proximate rearward edge 43 of housing 12 and key row 24, glidepad 26, thumb rest area 28 provided between key row 24 and glidepad 26, and an internal battery which recharges while attached to first housing 14. Second housing 12 is pivotally attached to first housing 14 at hinge 23 which pivots proximate rearward edge 43 of second housing 12 and proximate first edge 42 of first housing 14. Rearward edge 43 of second housing 12 is rounded to provide a lower pivot point between housing 12 and housing 14, without the need for a separate chassis, so that second housing 12 directly pivots with first housing 14. When detached, second housing 12 can continue to communicate with first housing 14 by a wireless IR link. The keyboard housing may be attached and detached from the main chassis using any number of means known in the art. The means for recharging the keyboard housing may be below the hinge line or preferably on the back for easy access. Flange 20 may be attached to the main chassis using a drop-in design with a push pin.

Figure 2A:
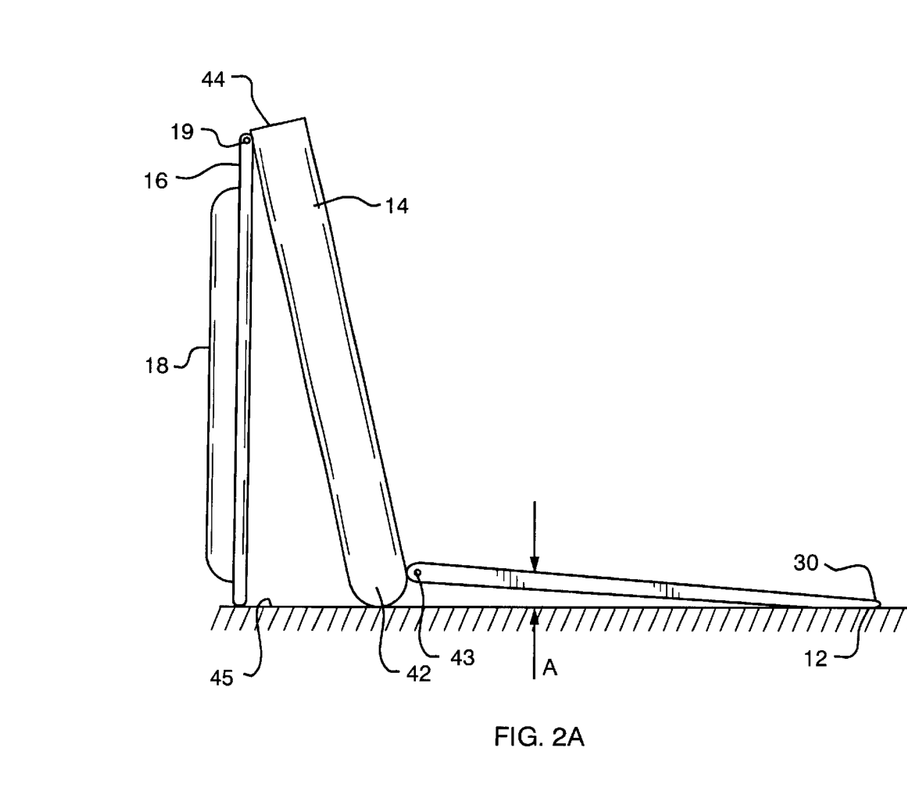
FIG. 2A is a side view of the preferred embodiment of the laptop computer of the invention shown in FIG. 1.
Figure 2B:
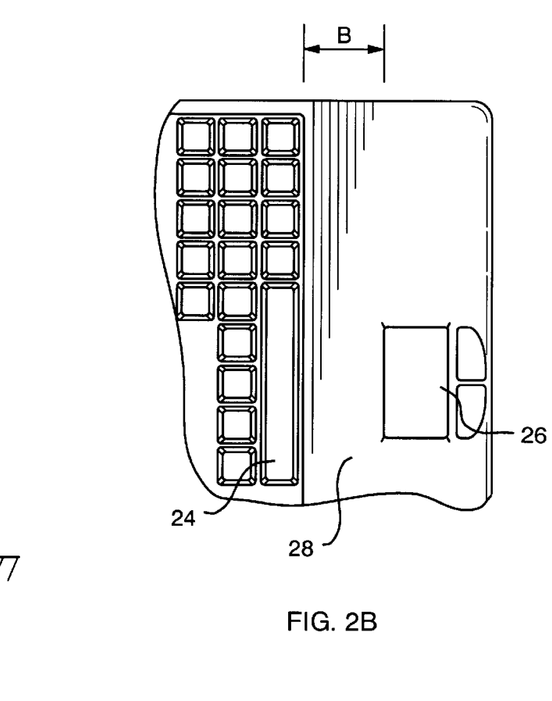
FIG. 2B is a partial top view of the housing 12 of the preferred embodiment shown in FIG. 1.

Second housing 12 tapers in width from rearward edge 43 to forward edge 30 to provide a keyboard having a low profile relative to surface 45 on which second housing 12 rests, as shown in FIG. 2A by arrows A, for a more comfortable wrist position. The distance between glidepad 26 and key row 24 is greater by about 1 cm in the accordion-fold computer of the invention than a typical "clam-shell" computer to allow the user to rest his or her thumbs on the top surface of second housing 12 to prevent unintended contact with glidepad 26. The distance between the keyboard and the glidepad is equal to or greater than 1 cm and preferably about 2 cm. This thumb rest area is generally referred to as thumb rest area 28 shown generally between arrows B (FIG. 2B). Second housing 12 is able to provide a lower profile keyboard and a larger thumb rest area than a "clam-shell" computer because, unlike a "clam-shell" computer, the main vertical chassis, first housing 14, houses the processing units of computer, the means for dissipating heat and the floppy disk drives.

As shown in FIG. 2A, third housing 16 provides generally vertical support for first housing 14 when computer 10 is fully deployed to an open position. Third housing 16 also carries power pack 18 (FIG. 2A) on the outside surface of housing 16. Third housing 16 is pivotally attached to first housing 14 proximate second edge 44 of first housing 14 by hinge 19. Third housing 16 not only provides support to first housing 14 and provides more area and volume for greater battery capacity, but also increases the efficiency of the batteries of third housing 16 and the components of first housing 14 by separating the batteries of third housing 16 from the components of first housing 14. By employing two separate housings, natural convection cooling is used to cool both the batteries of housing 16 and the components of housing 14.

Figure 3:
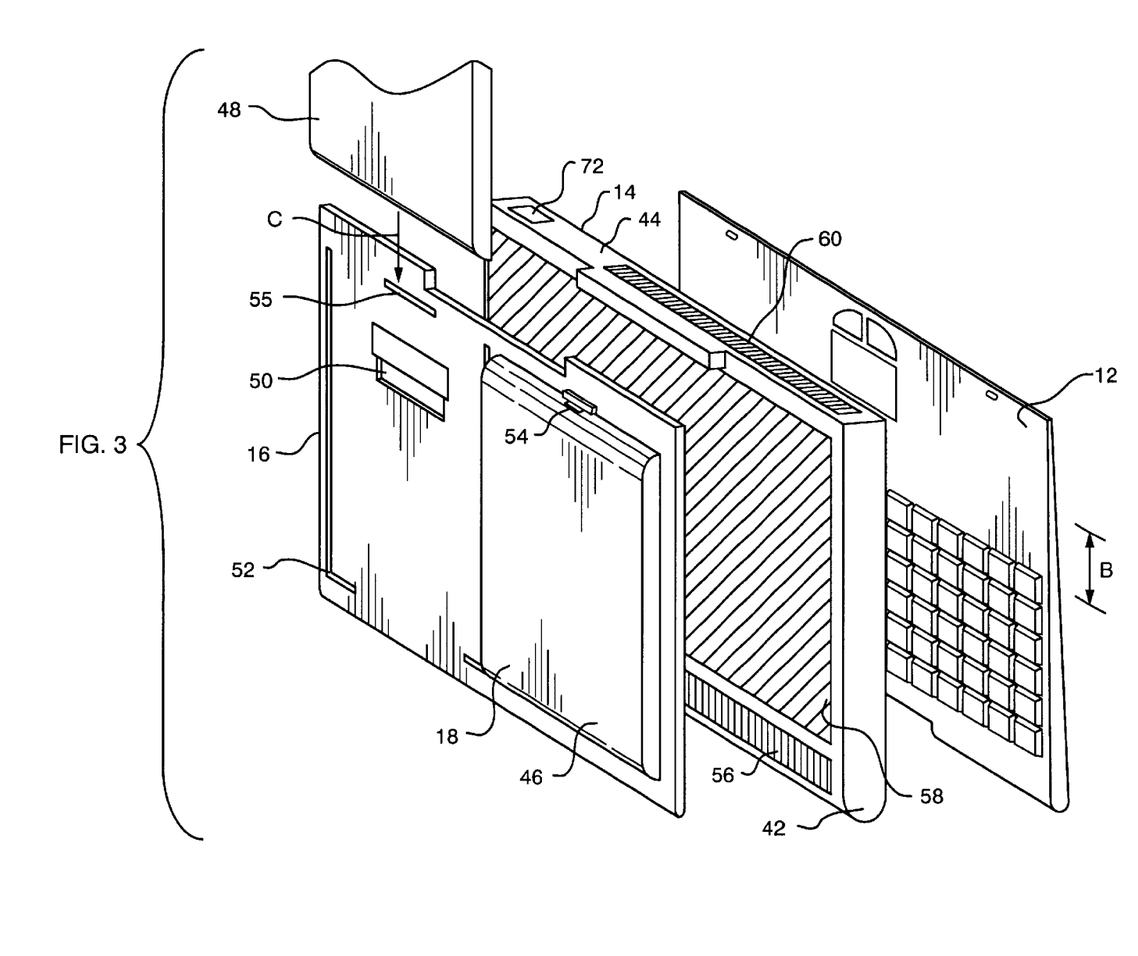
FIG. 3 is an exploded, perspective view of the preferred embodiment shown in FIG. 1.

As shown in FIG. 3, power pack 18 preferably comprises dual packs 46 and 48. Dual packs 46 and 48 may interchangeably comprise one or two battery packs and/or an AC adaptor. In FIG. 3, dual pack 46 is shown installed and dual pack 48 is in the process of being installed.

Although there are alternative types of battery packs commercially available which can be used with the invention, the battery pack of the invention preferably comprises two lithium polymer battery cells. Lithium polymer cells are made up of thin, flexible sheets. Using internal chemistry similar to conventional lithium ion battery technology, lithium polymer cells replace the liquid battery electrolyte with a thin, electrolyte impregnated plastic sheet. Conventional metal battery plates are replaced with metal foil electrodes. The lithium polymer electrolyte is sandwiched between the metal foil electrodes, which together are sealed in a plastic and metal foil packet. Each lithium battery cell can provide about 100 Wh of energy, therefore a single battery pack can provide about 200 Wh of energy, depending on the number and type of optional features incorporated in the laptop.

Dual packs 46 and 48 are carried on the outside surface of third housing 16. The packs are assembled and attached to housing 16 by sliding each pack in the direction of arrow C so that runners (not shown) provided on the underside of each pack engage corresponding grooves 52 provided on the outside surface of third housing 16, until spring-loaded latch 54 engages notch 55. Each pack is disengaged by pressing down latch 54 and sliding the pack upwards in the opposite direction of arrow C. When each pack is installed, connector 50 of housing 16 engages a corresponding connector provided on the inside surface of each pack. When the packs are removed a cover is provided to protect connector 50.

The thermal management system of computer 10 is shown in FIG. 3 and in part comprises heat sink 58 located on the rearward surface of first housing 14, intake air vents 56 proximate first edge 42 of housing 14 and exhaust air vents 60 proximate second edge 44 of housing 14. When computer 10 is fully deployed as shown in FIG. 4C, cool air is drawn into intake air vents 56 and funneled upwards through heat sink 58, and the subsequently heated air is exhausted through exhaust vents 60. The chassis of computer 10 is preferably metal to provide an additional means for dissipating heat generated by the components of computer 10, as shown in part in FIG. 5B encapsulating housing 14.

Figure 5A:
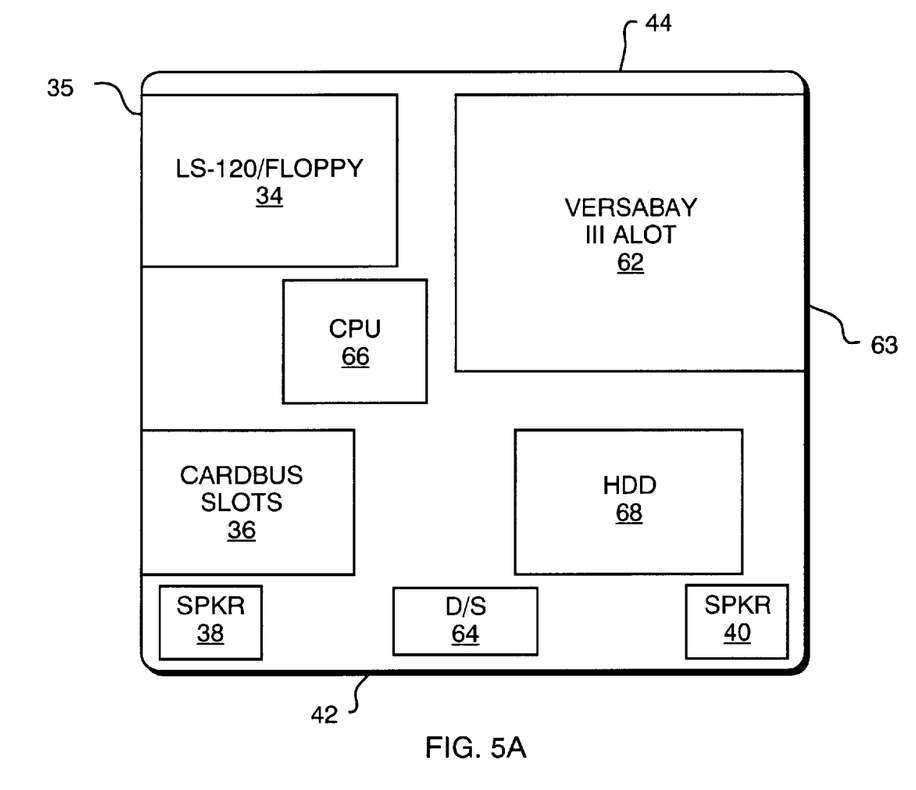
FIG. 5A is a cross-sectional, rear view of housing 14 of the preferred embodiment shown in FIG. 1.

The layout of the internal components of first housing 14, which are sandwiched between LCD 32 and heat sink 58 (FIG. 5B), is shown in FIG. 5A from the back side of first housing 14. Floppy disk drive 34 is located in the upper left quadrant of housing 14 with receiving slot 35 accessible from the outside (FIG. 1), CD or DVD ROM drive 62 is located in the upper right quadrant with receiving slot 63 (not shown) likewise accessible from the outside on the opposing side of housing 14. Central processing unit 66 is generally centrally located in housing 14, hard disk drive 68 is located in the lower right quadrant of housing 14, cardbus slot 36 is located in the lower left quadrant of housing 14 and speakers 38 and 40 are located in the lower left and right quadrants of housing 14, respectively. Docking station connector 64 is preferably located in the bottom center between speakers 38 and 40.

Natural convection cooling is achieved, and thus contributes to the efficiency of the thermal management system of computer 10, by packaging the electronics vertically behind LCD 32 as shown in FIG. 5A and by packaging the power packs, which also generate heat, vertically on the outside surface of third housing 16 away from the processing components.

Figure 4A:
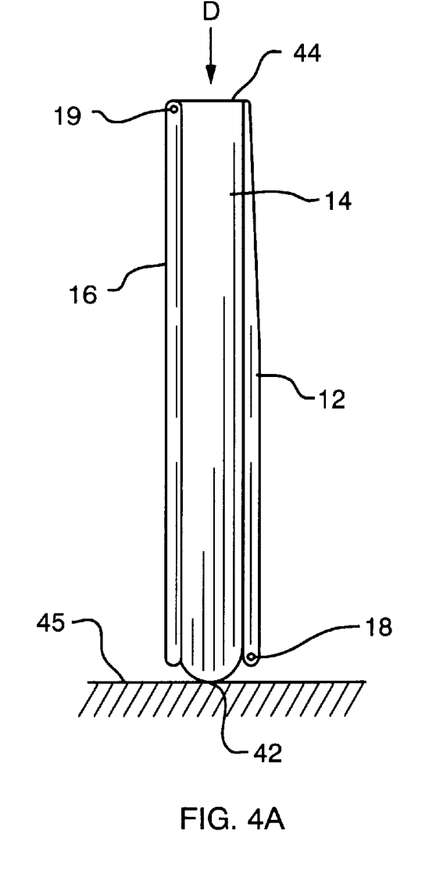
FIGS. 4A, 4B and 4C are side views of the preferred embodiment shown in FIG. 2A in increasing stages of deployment.
Figure 4B:
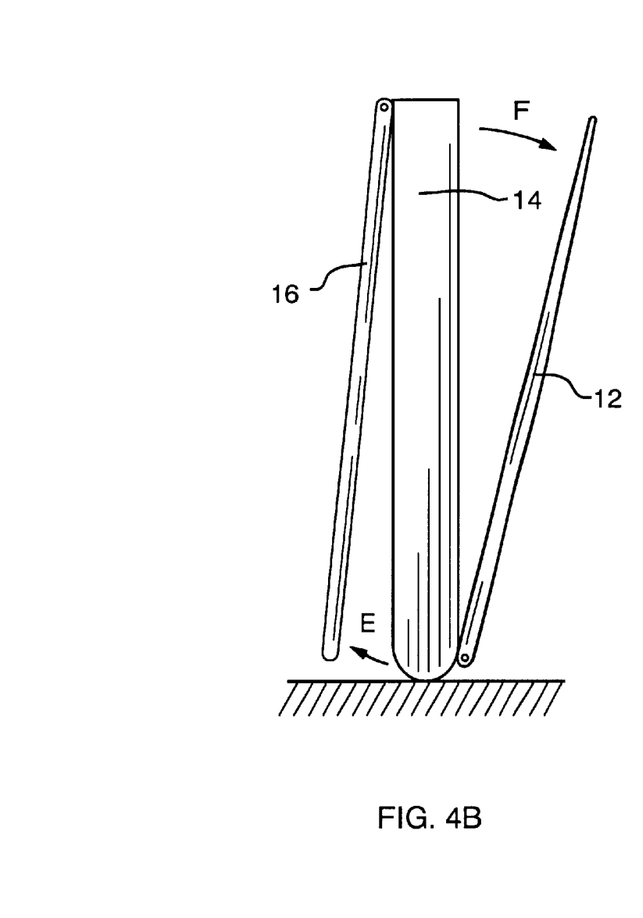
Figure 4C:
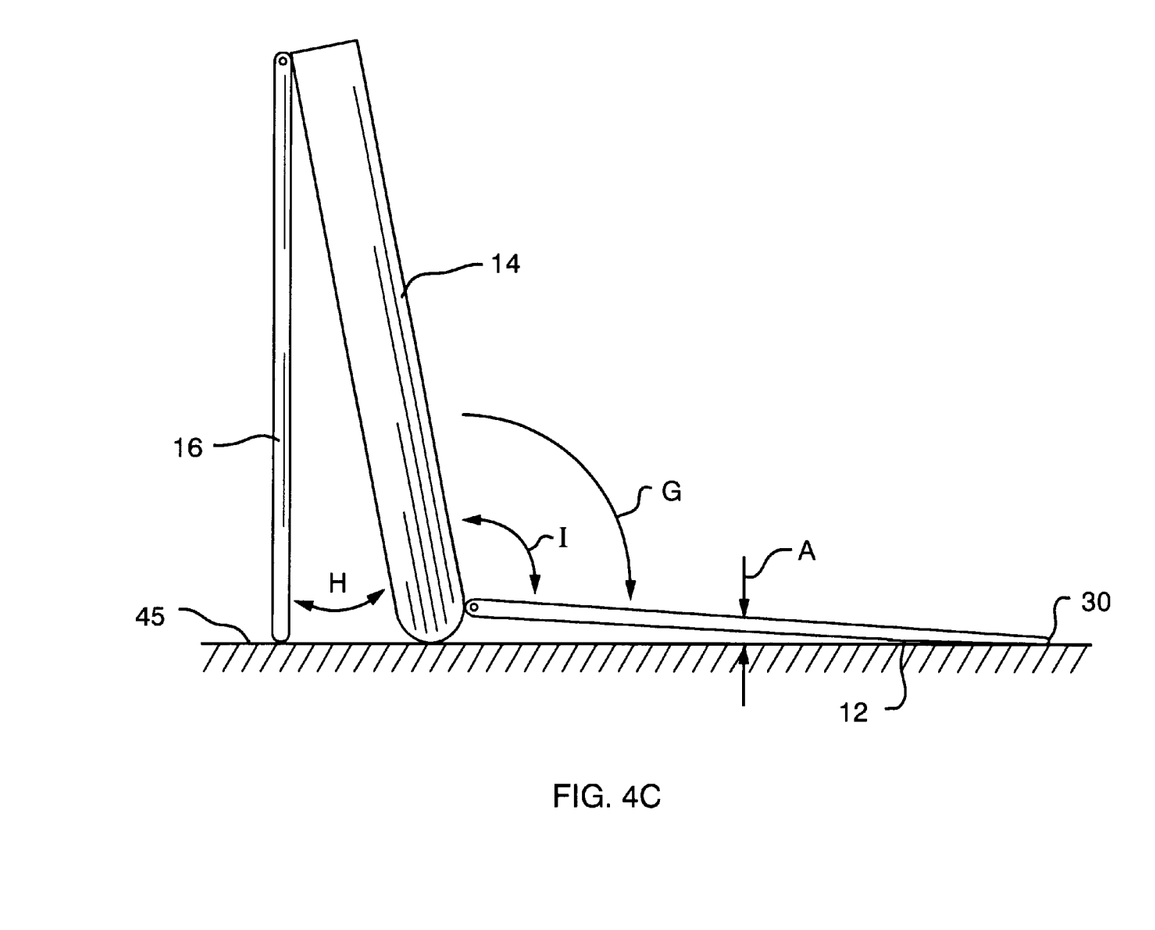
Figure 5B:
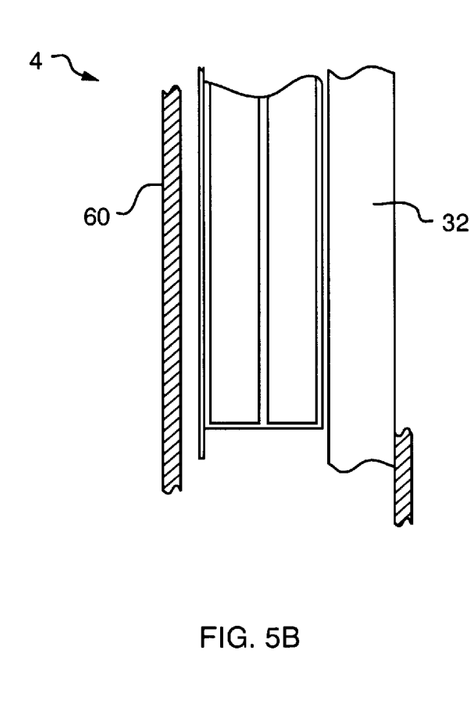
FIG. 5B is a cross-sectional, side view of housing 14 of the preferred embodiment shown in FIG. 1.

Computer 10 folds and unfolds like the folds on an accordion as shown in FIGS. 4A, 4B and 4C. To deploy computer 10 from a stowed position, computer 10 should be stood upright in a vertical position, as shown by arrow D, so that housing 14 is perpendicular to surface 42, in which position first edge 42 of first housing 14 rests on surface 42. Third housing 16 is drawn slightly upwards in the direction of arrow E, pivoting at hinge 19, a sufficient distance to offset and support the weight of first housing 14. Third housing 16 supports first housing 14 in a manner similar to an easel. A stop mechanism (not shown) is preferably provided to maintain housing 16 in a user preset position relative to first housing 14. In a deployed position, third housing 16 is generally perpendicular to surface 42 and first housing 14 is slightly angled relative to third housing 16 to form acute angle II therebetween generally along edge 44, as shown in FIG. 4C. In practice, the relative positions of the third and first housings will depend on the user's preference. Likewise, second housing 12 is drawn downward in the direction of arrows F and G, pivoting at hinge 18, until forward edge 30 of second housing 12 rests against surface 42 to form an obtuse angle I generally along first edge 42. Angle I should be at least 90° to prevent first housing 14 from falling forward, unless a stop mechanism is provided.

Computer 10 can be deployed automatically by pressing deploy latch 72 (FIG. 3) preferably located on the top surface of second edge 44 of first housing 14. Auto-deployment occurs in the same manner as described above. Computer 10 is stood and held in an upright, vertical position by the user and latch 72 is depressed. When latch 72 is depressed, third housing 16 and second housing 12 automatically pivot slightly upwards and downward in the direction of arrows E and G, respectively, to their optimum positions. Computer 10 can be further configured to boot automatically upon manual or automatic deployment, wherein the release feature is also the power switch.

Figure 6:
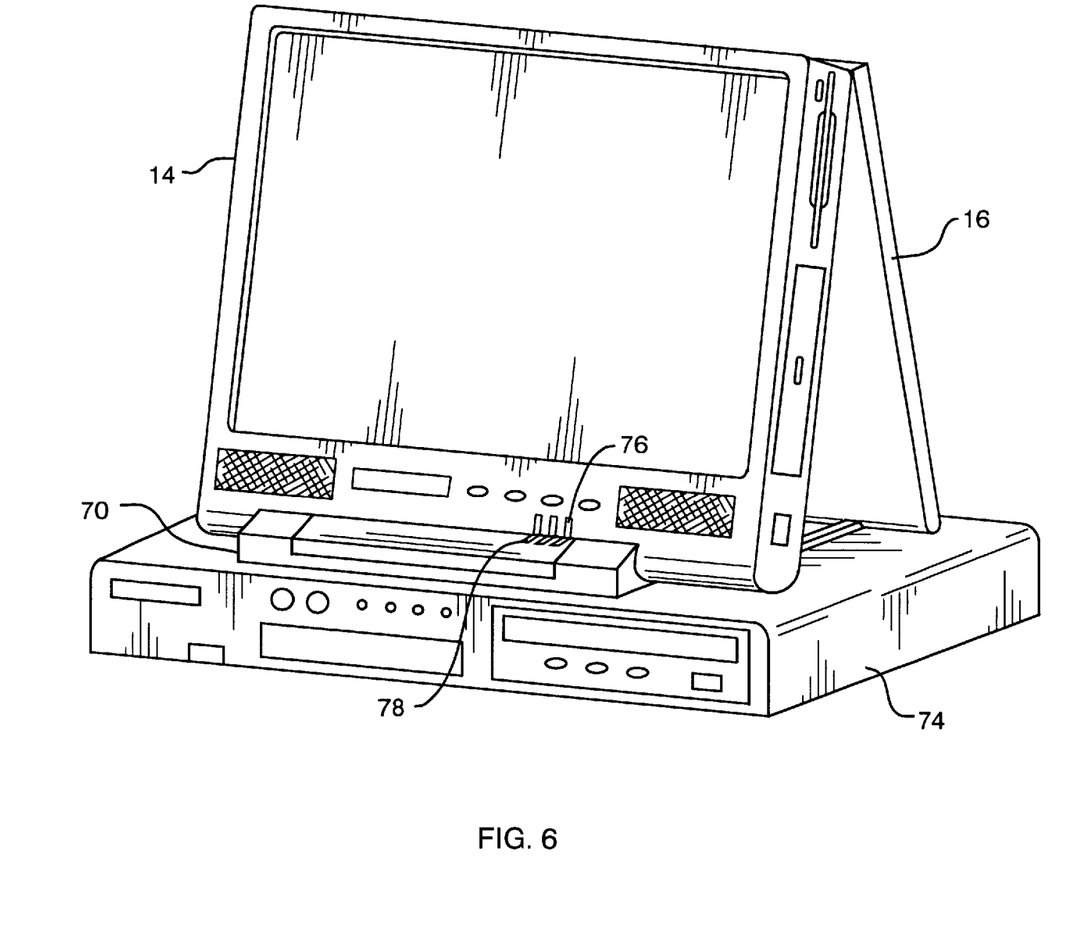
FIG. 6 is a perspective view of housings 14 and 16 vertically docked to a device for docking to a desktop computer.

As shown in FIG. 6, computer 10 also has the capability to be vertically docked to docking station 74. In the embodiment shown in FIG. 6, second housing 12 has been detached from first housing 14 and first housing 14 is docked to a corresponding groove in docking station 74 so that housing contact 76 engages docking station contact 78 and third housing 16 is docked to a second corresponding groove in docking station 74. The orientation of the contacts are preferably vertical to enable a drop-in design instead of a flex cable. Computer 10 thus provides the user with small footprint, vertical docking capability.

One of the features of the accordion-fold laptop computer of the invention is its versatility. It is envisioned that the various components of the accordion-fold computer of the invention may be resized, reconfigured or laid out within a given housing and/or among the housings to accommodate optional features or changes and advancements in computer technology.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An accordion-fold laptop computer, which folds to a closed position and unfolds to an open position, comprising,
   a first housing having a first edge and an opposing second edge, comprising at least one each of a processor, a hard disk drive and a display screen;
   a second housing, attached to said first housing proximate said first edge, comprising a keyboard;
   a third housing, pivotally attached to said first housing proximate said second edge.

2. The laptop computer of claim 1 in said closed position, wherein said first housing is substantially sandwiched between said second and third housings.

3. The laptop computer of claim 2, wherein said second housing is pivotally attached to said first housing proximate said first edge.

4. The laptop computer of claim 3, further comprising a means for automatically deploying said laptop computer from said closed position to said open position at which said first housing forms an angle along said first edge with said second housing of at least 90°.

5. The laptop computer of claim 4, further comprising a means for automatically booting a computer program resident in said first housing upon deployment.

6. The laptop computer of claim 3, further comprising a means for automatically deploying said laptop to an open position at which said first housing forms an angle along said first edge with said second housing of at least 90° and said first housing forms an acute angle along said second edge with said third housing.

7. The laptop computer of claim 1 in an open position, wherein said first housing forms an angle along said first edge with said second housing of at least 90° and further comprises one or more means for receiving a portable memory storage device.

8. The laptop computer of claim 7, wherein one or more of said means for receiving a portable memory storage device comprises at least one slot for receiving one or more DVD-ROMs.

9. The laptop computer of claim 1, wherein said third housing further comprises a power source.

10. The laptop computer of claim 1, wherein said first housing further comprises a means for dissipating heat.

11. The laptop computer of claim 1, wherein said first housing further comprises one or more means for receiving a portable memory storage device.

12. The laptop computer of claim 10, wherein one or more of said means for receiving a portable memory storage device comprises a slot for receiving one or more of a floppy disk, a CD-ROM or a DVD-ROM.

13. The laptop computer of claim 1, wherein said first housing further comprises one or more speakers.

14. The laptop computer of claim 1, wherein said first housing further comprises a metal chassis.

15. The laptop computer of claim 1, wherein said second housing is removably attached to said first housing proximate said first edge.

16. The laptop computer of claim 15, further comprising a means for vertically docking to a docking station.

17. The laptop computer of claim 15, wherein said second housing further comprises a wireless means for communicating with said first housing.

18. A laptop computer with an improved thermal management system, comprising,
   a first housing, comprising at least one each of a processor, a hard disk drive, a means for receiving a portable memory device, a display screen, and a means for actively dissipating heat;
   a second housing, attached to said first housing, comprising a keyboard; and
   a means for stabilizing said first housing; wherein said means for stabilizing said first housing comprises a third housing, pivotally attached to said first housing, comprising one or more power sources.

19. The laptop computer of claim 18, wherein at least one of said power sources comprises an AC power pack.

20. The laptop computer of claim 18, wherein said second housing is pivotally attached to said first housing.

21. The laptop computer of claim 18, said means for actively dissipating heat comprises at least one each of, a heat sink, a cool air intake vent and a warm air exhaust vent.

22. A laptop computer with improved ergonomics, comprising,
   a first housing, having a bottom edge, comprising at least one each of a processor, a hard disk drive, a means for receiving a portable memory device, a display screen, and a means for actively dissipating heat;
   a second housing, having a forward edge, a rearward edge and a thickness, comprising a keyboard, wherein said thickness of said second housing decreases from approximately said rearward edge to approximately said forward edge, and wherein said rearward edge is pivotally attached to said first housing proximate said bottom edge of said front housing; and
   a means for stabilizing said first housing.

23. The laptop computer of claim 22, wherein said keyboard comprises a rearward row of keys and a forward row of keys wherein said rearward row of keys is proximate said rearward edge of said second housing, and said second housing further comprises a glidepad proximate said forward edge of said second housing and a thumb rest between said forward row of keys of said keyboard and said glidepad.

24. A laptop computer with increased battery capacity, comprising,
- a first housing having a first edge and an opposing second edge, comprising a display screen;
- a second housing, attached to said first housing proximate said first edge, comprising a keyboard;
- a third housing, pivotally attached to said first housing proximate said second edge, comprising one or more power sources.

25. The laptop computer of claim 24, wherein one or more of said power sources comprises a battery pack.

26. The laptop computer of claim 25, wherein one or more of said battery packs comprises one or more lithium polymer batteries.

27. The laptop computer of claim 24, wherein one or more of said power sources comprises an AC power pack.

* * * * *